(12) United States Patent
Zheng

(10) Patent No.: US 8,073,330 B2
(45) Date of Patent: Dec. 6, 2011

(54) DIGITAL SUBSCRIBER LINE ACCESS MULTIPLEXER, OPTICAL NETWORK UNIT, OPTICAL LINE TERMINAL AND BASE STATION

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 765 days.

(21) Appl. No.: 12/130,428

(22) Filed: May 30, 2008

(65) Prior Publication Data

US 2008/0298809 A1    Dec. 4, 2008

(30) Foreign Application Priority Data

May 31, 2007  (CN) .......................... 2007 1 0105280

(51) Int. Cl.
*H04B 10/20* (2006.01)
*H04J 14/08* (2006.01)

(52) U.S. Cl. .......................................... 398/66; 398/100

(58) Field of Classification Search .............. 398/66–72, 398/100
See application file for complete search history.

(56) References Cited

U.S. PATENT DOCUMENTS

| | | | |
|---|---|---|---|
| 6,721,797 B1* | 4/2004 | Kim .............................. | 709/232 |
| 2005/0018685 A1 | 1/2005 | Butler et al. | |
| 2005/0047782 A1* | 3/2005 | Davis et al. ..................... | 398/58 |
| 2005/0058118 A1* | 3/2005 | Davis et al. ................... | 370/351 |
| 2005/0129030 A1* | 6/2005 | Choi et al. ............... | 370/395.53 |
| 2007/0064693 A1 | 3/2007 | Peschi et al. | |
| 2009/0290875 A1* | 11/2009 | Xu et al. ......................... | 398/66 |

FOREIGN PATENT DOCUMENTS

| | | |
|---|---|---|
| CN | 1925407 | 3/2007 |
| KR | 20050020134 | 3/2005 |

OTHER PUBLICATIONS

Ewers Consult. Bitstream Access. Dec. 2006.
Bitstream Access. ERG Common Position—Adopted on Apr. 2, 2004.
Extended European Search Report regarding Application No. 08715384.7-1249, dated Sep. 10, 2010.
Written Opinion of the International Searching Authority regarding Application No. PCT/CN2008/070652, mailed Jul. 17, 2008. Translation provided by Huawei Technologies Co., Ltd.
WiMAX Forum Network Architecture (Stage 2: Architecture Tenets, Reference Model and Reference Points) [WiMAX Interworking with DSL]. Revision 1.0.0: Mar. 9, 2007.
WiMAX Forum Network Architecture (Stage 2: Architecture Tenets, Reference Model and Reference Points) [Part 3—Informative Annex]. Revision 1.0.0: Mar. 9, 2007.

(Continued)

*Primary Examiner* — Leslie Pascal
(74) *Attorney, Agent, or Firm* — Harness, Dickey & Pierce, P.L.C.

(57) ABSTRACT

A Digital Subscriber Line Access Multiplexer (DSLAM) includes a Digital Subscriber Line interface unit for processing Physical Layer and Data Link Layer of the Digital Subscriber Line (DSL); at least two virtual DSLAM units adapted to simulate DSLAM to process a packet from the DSL interface unit; and a backhaul interface unit adapted to receive a packet processed by the DSLAM unit, and to send a packet from an access edge node or carrier equipment to the virtual DSLAM unit for processing. The disclosure further provides an Optical Network Unit, an Optical Line Terminal and a Base Station.

17 Claims, 5 Drawing Sheets

OTHER PUBLICATIONS

WiMAX Forum Network Architecture (Stage 2: Architecture Tenets, Reference Model and Reference Points) [Part 2]. Revision 1.0.0: Mar. 9, 2007.

WiMAX Forum Network Architecture (Stage 2: Architecture Tenets, Reference Model and Reference Points) [Part 1]. Revision 1.0.0: Mar. 9, 2007.

WiMAX Forum Network Architecture (Stage 2: Architecture Tenets, Reference Model and Reference Points) [Part 0]. Revision 1.0.0: Mar. 9, 2007.

WiMAX Forum Network Architecture (Stage 2: Architecture Tenets, Reference Model and Reference Points) [3GPP2—WiMAX Interworking]. Revision 1.0.0: Mar. 9, 2007.

WiMAX Forum Network Architecture (Stage 2: Architecture Tenets, Reference Model and Reference Points) [3GPP—WiMAX Interworking]. Revision 1.0.0: Mar. 9, 2007.

Technical Report. DSL Forum TR-101. Migration to Ethernet-Based DSL Aggregation. Apr. 2006. Produced by: Architecture and Transport Working Group.

DSL Forum. Working Text WT-147, Draft, Version 1.4. Layer 2 Control Mechanism for Broadband Multi-Service Architectures. Feb. 1, 2007. Produced by Architecture and Transport Working Group.

IEEE Standards. 802.16. IEEE Standard for Local and metropolitan area networks. Part 16: Air Interface for Fixed Broadband Wireless Access Systems. IEEE Computer Society and the IEEE Microwave Theory and Techniques Society. Oct. 1, 2004.

WiMAX Forum Network Architecture (NWG Stage 2 and Stage 3 Abbreviations). Revision 1.0.0: Mar. 9, 2007.

International Search Report for International Application No. PCT/CN2008/070652, dated Jun. 23, 2008, with English translation.

* cited by examiner

DIGITAL SUBSCRIBER LINE ACCESS MULTIPLEXER, OPTICAL NETWORK UNIT, OPTICAL LINE TERMINAL AND BASE STATION

CROSS-REFERENCE TO RELATED APPLICATIONS

This application claims the benefit of Chinese Application No. 200710105280.2, filed May 31, 2007. The disclosure of the above application is incorporated herein by reference.

FIELD

The present disclosure relates to the field of mobile communication, and in particular to a Digital Subscriber Line Access Multiplexer, an Optical Network Unit, an Optical Line Terminal and a Base Station.

BACKGROUND

The statements in this section merely provide background information related to the present disclosure and may not constitute prior art.

Figure 1:
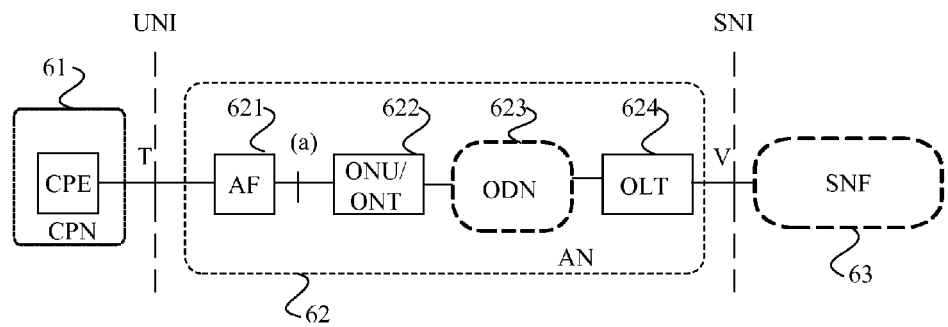

FIG. 1 shows an architecture diagram of an Optical Access Network (OAN) in the prior art. The OAN includes a Customer Premises Network (CPN) 61, an Access Network (AN) 62 and a Service Node Function (SNF) 63. Primary Network Elements (NE) of the CPN and the AN in the OAN include an Adaptation Function (AF) 621, an Optical Network Unit (ONU)/Optical Network Terminal (ONT) 622, an Optical Distribution Node (ODN) 623, and an Optical Line Terminal (OLT) 624. T represents a reference point of a User Network Interface (UNI), and V represents a reference point of a Service Network Interface (SNI). The OLT 624 provides the ODN 623 with a network interface and connects to one or more ODNs 623. The ODN 623 provides transmission means for the OLT 624 and the ONU 622. The ONU 622 provides the OAN with a User side interface and connects with the ODN 623. A Customer Premises Equipment (CPE) connects to the AF 621 via an UNI, such as a Digital Subscriber Line. The AF 621 converts the packet format from the UNI format to (a) interface (such as an Ethernet Link) format via which the AF 621 may connect with the ONU 622; then the ONU 622 converts the packet format into a format via which the packet may be transmitted in the ODN 623, such as an Ethernet Passive Optical Network (EPON) encapsulation, and a generic group frame encapsulation of a Gigabit Passive Optical Network (GPON); and finally the OLT 624 converts the packet format into the SNI (such as an Ethernet Link) packet format, and then the SNF 63 may be accessed. In the Access Network, the AF primarily provides the mutual conversion between the ONU/ONT interface and the UNI; alternatively, the AF may be built into the ONU, thus the reference point (a) is not required. The AF may also be positioned behind the OLT to be used for the mutual conversion between the OLT interface and the SNI. In this way, the AF may act as a Function entity in CPN or a Function entity in AN.

Figure 2:
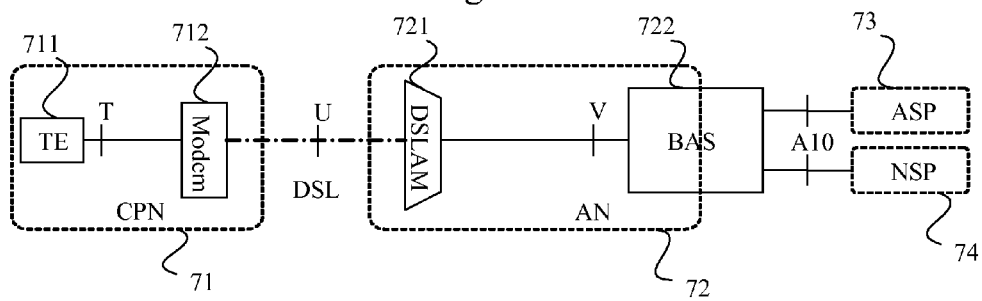

FIG. 2 shows an architecture diagram of a DSL in the prior art, which includes a CPN 71, an AN 72, an Application Service Provider (ASP) 73 and a Network Service Provider (NSP) 74. In the figure, T is a reference point between a Terminal Equipment (TE) 711 and a DSL Modem 712 in the CPN; U is a reference point between the DSL Modem 712 and a Digital Subscriber Line Access Multiplexer (DSLAM) 721. In the AN 72, an Aggregation Network exists between the DSLAM 721 and a Broadband Remote Access Server (BRAS) 722; V is an Ethernet Aggregation reference point between the DSLAM 721 and the BRAS 722 in the AN 72; A10 is a reference point between the AN 72 and Service Providers (SP), such as the ASP 73 and the NSP 74, via which the ASP may be connected to an NSP in possession of an AN, or an NSP may be connected to a visited AN in roaming situations. The CPN 71 may be connected with the AN 72 via DSL access technologies.

Figure 3:
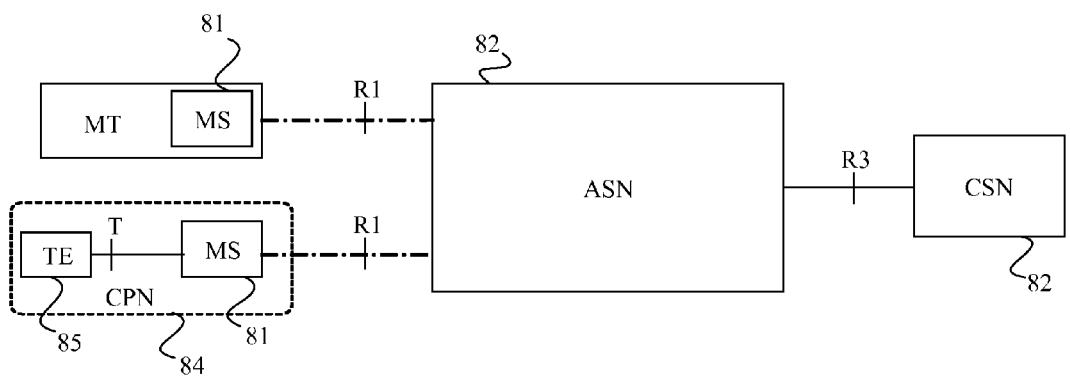

FIG. 3 shows an architecture diagram of a WiMAX network in the prior art, in which R1 is a reference point between a Mobile Station (MS) 81 and an Access Service Network (ASN) 82; R3 is a reference point between the ASN 82 and a Connection Service Network (CSN) 83; and T is a reference point between a Terminal Equipment (TE) 85 and the MS 81. The MS may be a pure Mobile Terminal, or a TE may be attached to a MS. The ASN 82 includes a Base Station (BS) and an Access Service Network Gateway (ASW GW).

Currently, it is desired that a Network Access Provider (NAP) opens and wholesales its Access Network to SPs. A problem rises that, the SP requires that different protocols may be supported and access nodes may be configured flexibly according to its own requirements, however, the existing access nodes is not designed for meeting the wholesale requirements, thus an AN may not be shared between multiple NSPs and may not be managed independently by an NSP.

SUMMARY

Various embodiments of the disclosure provide a Digital Subscriber Line Access Multiplexer, an Optical Network Unit, an Optical Line Terminal and a Base Station to solve the problem of the sharing of an AN among multiple NSPs and an independent management for the AN by an NSP in a wholesale scenario.

Various embodiments further provide a Digital Subscriber Line Access Multiplexer, DSLAM, including:

at least two logic-independent virtual DSLAM units adapted to process a packet according to a predefined configuration;

a Digital Subscriber Line interface unit connected with one or more Customer Premises Equipments, CPEs, via a Digital Subscriber Line, for processing Physical Layer and Data Link Layer of the Digital Subscriber Line, and for sending a packet from the one or more CPEs to the corresponding virtual DSLAM unit; and a backhaul interface unit connected with one or more access edge nodes or carrier equipments via an Aggregation Network, adapted to send a packet processed by the virtual DSLAM unit to the access edge node or the carrier equipment corresponding to the virtual DSLAM unit, and to send a packet from the edge node or the carrier equipment to the virtual DSLAM unit corresponding to the edge node or the carrier equipment for processing.

Various embodiments further provide an Optical Network Unit, ONU, including:

at least two logic-independent virtual ONUs adapted to process a packet according to a predefined configuration;

a user interface unit connected with one or more Customer Premises Equipments, CPEs, via a Digital Subscriber Line, an Ethernet Line or a Power Line Communication Line, for processing Physical Layer and Data Link Layer of the Digital Subscriber Line, the Ethernet Line or the Power Line Communication Line, and for sending a packet from the one or more CPEs to the corresponding virtual ONU; and an Optical Distribution Node interface unit connected with one or more Optical Line Terminals, OLTs via an Optical Distribution Node, ODN, for sending a packet processed by the virtual ONU to the OLT corresponding to the virtual ONU, and for sending a data package from the OLT to the virtual ONU corresponding to the OLT for processing.

Various embodiments further provide an Optical Line Terminal, OLT, including:

at least two logic-independent virtual OLT units adapted to process a packet based on a respective pre-configured protocol;

an Optical Distribution Node interface unit connected with one or more Optical Network Units or Optical Network Terminals, ONU/ONTs, via an Optical Distribution Node, ODN, for processing Physical Layer and Data Link Layer of a Passive Optical Network, and for sending a packet from the one or more ONU/ONTs to the corresponding virtual OLT unit; and a backhaul interface unit connected with one or more edge nodes or carrier equipments via an Aggregation Network, for sending a packet processed by the virtual OLT unit to the access edge node or the carrier equipment corresponding to the virtual OLT unit.

Various embodiments further provide a Base Station, BS, including:

at least two logic-independent virtual BS units adapted to process a packet based on a respective pre-configured protocol;

an air interface unit connected with one or more Customer Premises Equipments, CPEs, or wireless terminals via a wireless air interface, for processing a wireless Physical Layer and a Data Link Layer, and for sending a packet from the one or more CPEs or wireless terminals to the corresponding virtual BS unit; and a backhaul interface unit connected with one or more edge nodes or carrier equipments via an Aggregation Network, for sending a packet processed by the virtual BS unit to the access edge node or the carrier equipment corresponding to the virtual BS unit.

Various embodiments further provide an Optical Access Network, OAN, including a Customer Premises Equipment, CPE; an edge node or carrier equipment; an Optical Network Unit, ONU; and an Optical Line Terminal, OLT; in particular, the ONU includes:

at least two logic-independent virtual ONUs adapted to process a packet based on a respective pre-configured protocol;

a user interface unit connected with one or more Customer Premises Equipments, CPEs, via a Digital Subscriber Line, an Ethernet Line or a Power Line Communication Line, for processing Physical Layer and Data Link Layer of the Digital Subscriber Line, the Ethernet Line or the Power Line Communication Line, and for sending a packet from the one or more CPEs to the corresponding virtual ONU; and a first Optical Distribution Node interface unit connected with one or more Optical Line Terminals, OLTs via an Optical Distribution Node, ODN, for sending a packet processed by the virtual ONU to the OLT corresponding to the virtual ONU.

In the various embodiments of the disclosure, the logic-independent virtual processing units are provided in the access equipment, and each virtual processing unit processes a packet according to a predefined configuration. This solves the problem of the sharing of an AN among multiple NSPs and realizes the independent management for the AN by the NSP in a wholesale scenario. The SPs may be provided with different protocols depending on their requirements, thus the AN may be wholesaled to different NSPs by the NAP flexibly.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 4:
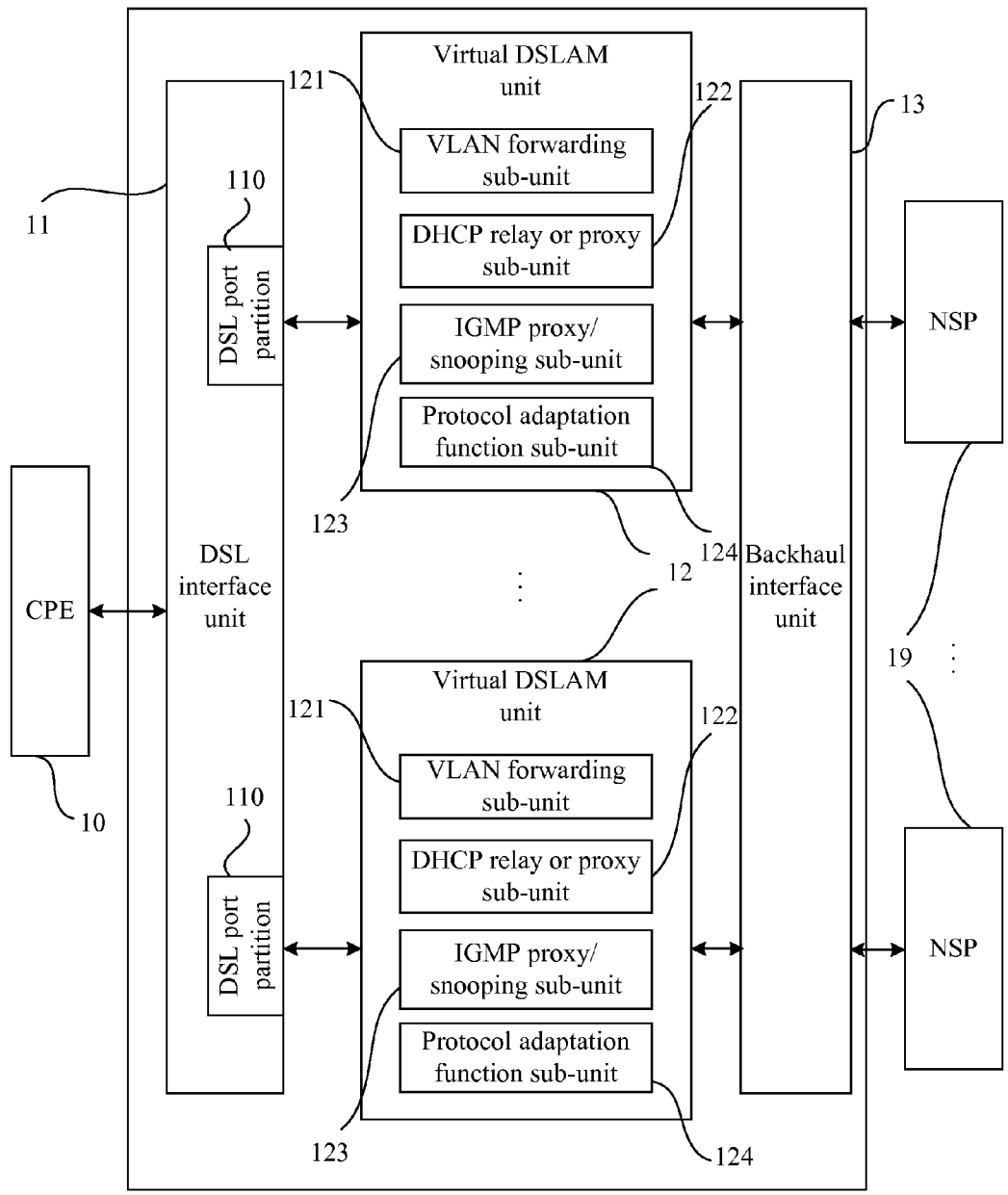
Figure 5:
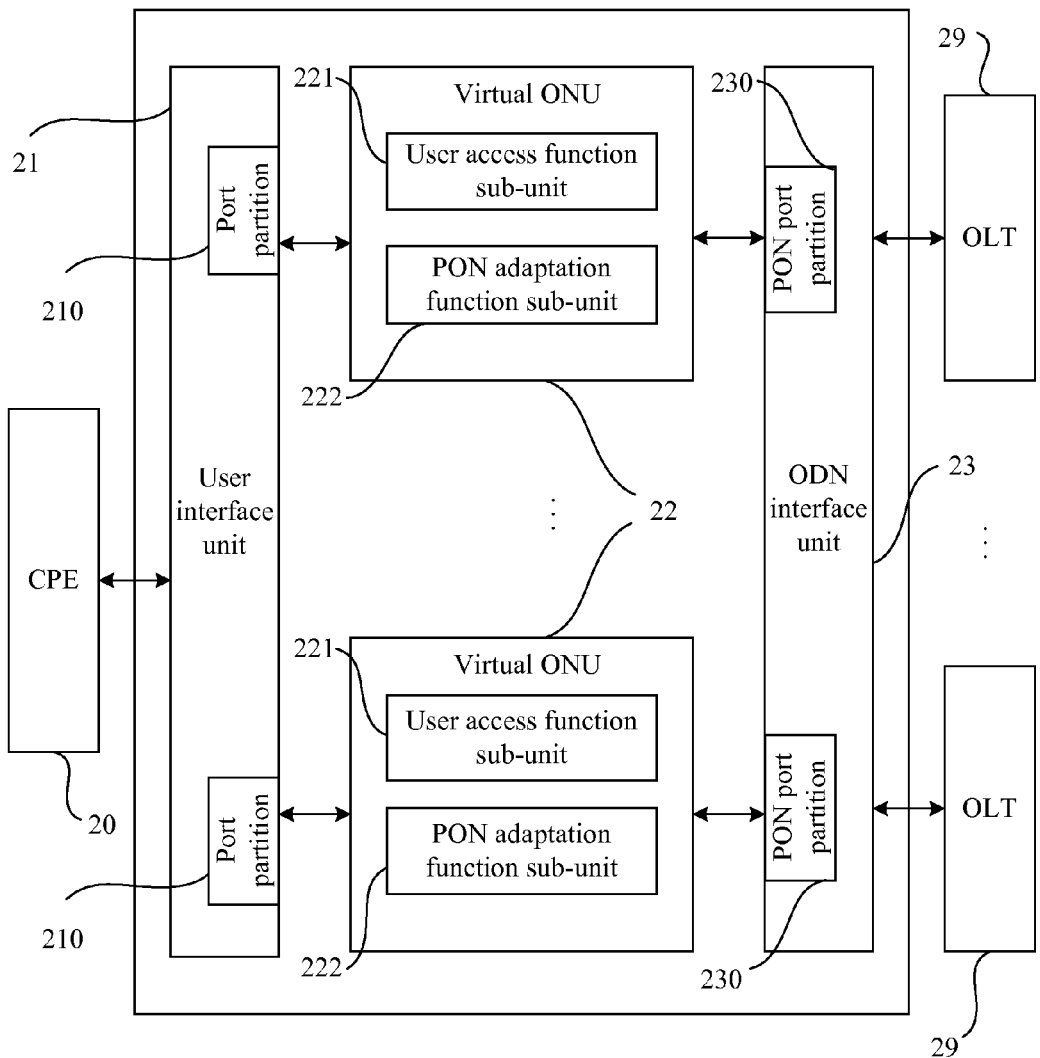
Figure 6:
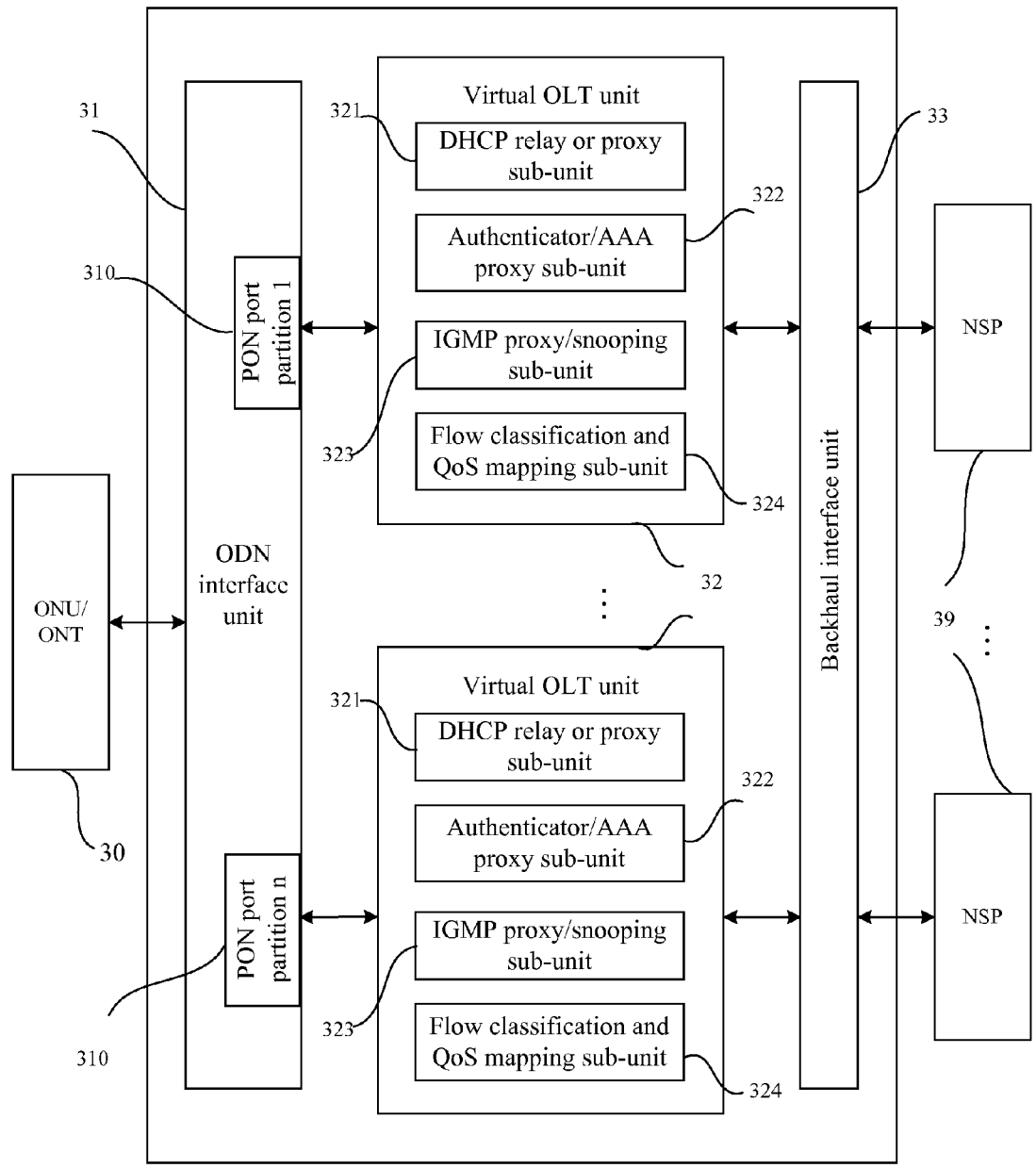
Figure 7:
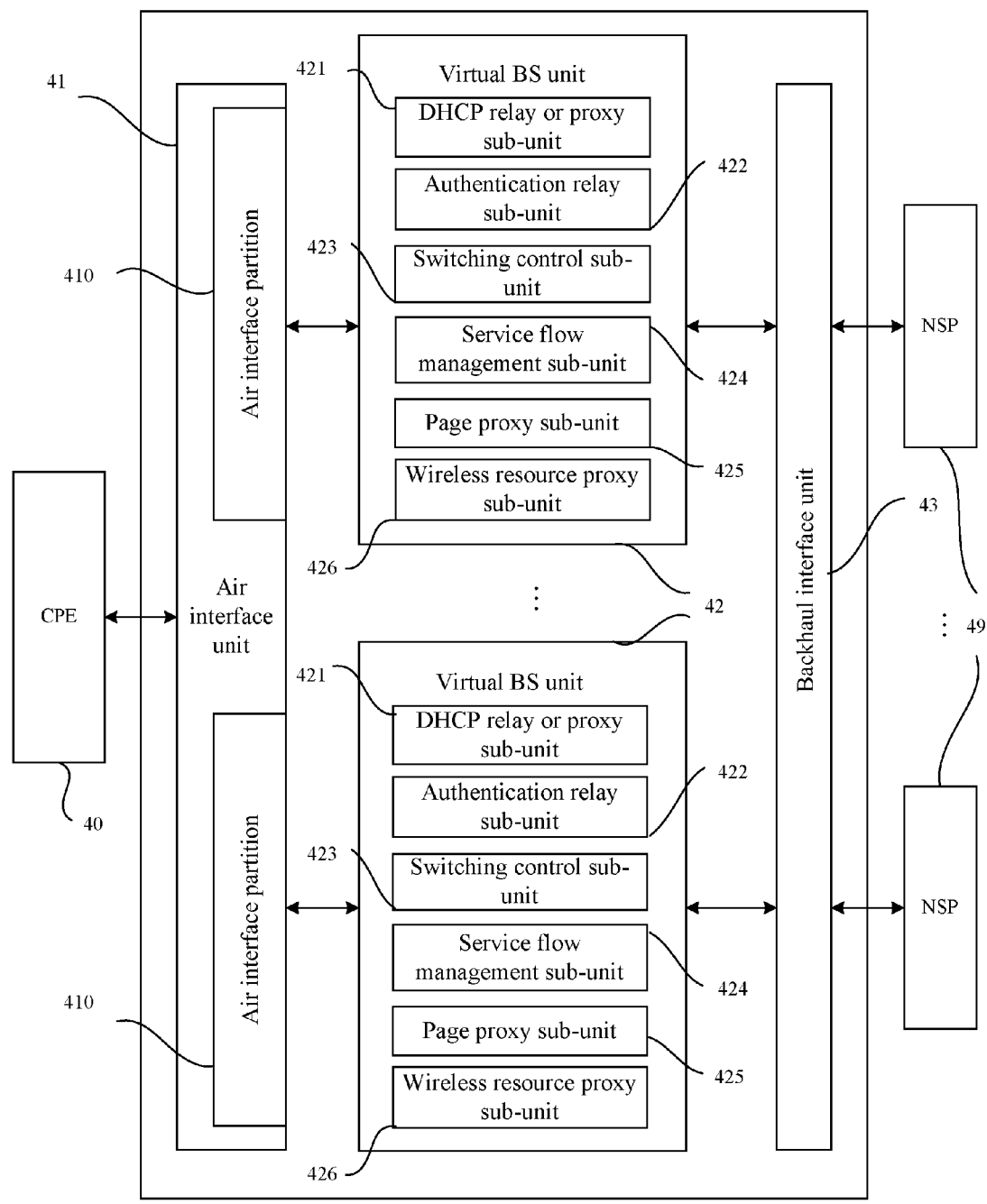

FIG. 1 is an architecture diagram of an OAN in the prior art;
FIG. 2 is an architecture diagram of a DSL in the prior art;
FIG. 3 is an architecture diagram of a WiMAX network in the prior art;
FIG. 4 is a structural diagram of an DSLAM according to an embodiment of the disclosure;
FIG. 5 is a structural diagram of an ONU according to an embodiment of the disclosure;
FIG. 6 is a structural diagram of an OLT according to an embodiment of the disclosure; and
FIG. 7 is a structural diagram of a BS according to an embodiment of the disclosure.

DETAILED DESCRIPTION

The following description is merely exemplary in nature and is not intended to limit the present disclosure, application, or uses.

The technical solutions of the various embodiments of the disclosure are further described in detail by way of accompanying drawings and embodiments.

FIG. 4 is a structural diagram of an DSLAM according to various embodiments of the disclosure, which includes, at least two logic-independent virtual DSLAM units 12, adapted to provide different protocols and process a packet according to a predefined configuration; a DSL interface unit 11, connected with a Customer Premises Equipment (CPE) 10 via a DSL, for processing Physical Layer and Data Link Layer of the DSL, and for sending a packet from the CPE 10 to the corresponding virtual DSLAM unit 12; and a backhaul interface unit 13, connected with an access edge node 19 (or carrier equipment) via an Aggregation Network, adapted to send a packet processed by the virtual DSLAM unit 12 to the access edge node 19 (or the carrier equipment) corresponding to the virtual DSLAM unit 12, and to send a packet from the edge node 19 (or the carrier equipment) to the virtual DSLAM unit 12 corresponding to the edge node 19 (or the carrier equipment) for processing.

As shown in FIG. 4, the DSL interface unit 11 is provided with DSL port partitions 110 corresponding to the virtual DSLAM units 12 for separating the virtual DSLAM units 12 from each other, and each virtual DSLAM unit 12 supports a respective DSL port partition 110. A DSL port is partitioned into the DSL port partitions based on SPs (NSPs are taken as an example in this embodiment), and the DSL port identifier, according to the TR101 definition of DSL Forum, includes any one or a combination of an actual Access Node Identifier (AN ID), a chassis number, a rack number, a frame number, a slot number, a sub-slot number, a port number, a Virtual Path Identifier (VPI), a Virtual Channel Identifier (VCI), a Virtual LAN Identifier (VLAN ID), an Ethernet Priority and a Differentiated Service code Point (DSCP).

The virtual DSLAM unit 12 has all the functions of an existing independent DSLAM which may support a respective DSL port partition 110, and may be wholesaled to an NSP 19 for independent control and management, thus realizes a wholesale over Layer two. The virtual DSLAM units 12 may be separated from each other in accordance with respective DSL port partitions.

As shown in FIG. 4, the virtual DSLAM unit 12 at least includes a VLAN forwarding sub-unit 121 for supporting N:1 VLAN forwarding function and 1:1 VLAN forwarding function; a Dynamic Host Configuration Protocol (DHCP) relay or proxy sub-unit 122 for supporting DHCP relay function where access loop identifier information is carried via DHCP; an Internet Group Management Protocol (IGMP) proxy/snooping unit 123 for snooping on a multicast destination IP address and/or a multicast source IP address of an IGMP packet so as to configure corresponding multicast media access control address filter; and a protocol adaptation sub-unit 124 for sensing PPPoE over ATM protocol encapsulation, IPoE over ATM protocol encapsulation, PPP over ATM protocol encapsulation or IP over ATM protocol encapsulation so as to be adaptive to a respective DSL terminal configuration. The DSLAM unit 12 may provide different protocols in accordance with different SP requirements, which provides extreme flexibility for wholesaling to different NSPs. For example, the first NSP may configure the first virtual DSLAM unit to support PPPoA (PPP over ATM), IGMP version 2 (IGMPv2) and 1:1 VLAN forwarding; and the second NSP may configure the second virtual DSLAM unit to support PPPoE (PPP over Ethernet), IGMP version 3 (IGMPv3) and N:1 VLAN forwarding.

In an upstream direction, NSPs may be separated by means of DSL port partitions and the like. The DSL interface unit 11 sends a packet from the first DSL port partition to the first virtual DSLAM unit for processing; the packet is converted from PPPoE into PPPoA and sent to an Edge Node (EN) by performing 1:1 VLAN forwarding to the backhaul interface unit 13, and the EN differentiates the packet via DSL port information such as a Circuit ID carried in a PPPoE TAG and sends it to the first NSP. The DSL interface unit 11 sends a data package from the second DSL port partition to the second virtual DSLAM unit for processing; the data package is processed based on PPPoE without terminating and sent to the EN by performing N:1 VLAN forwarding to the backhaul interface unit 13, and the EN differentiates the packet via DSL port information such as a Circuit ID carried in a PPPoE TAG and sends it to the second NSP.

In a downstream direction, NSPs may be separated by means of VLAN and the like. The backhaul interface unit 13 forwards a data package from the first NSP to the first virtual DSLAM unit based on VLAN; the virtual DSLAM unit converts the data package from PPPoE into PPPoA, performs N:1 VLAN forwarding to the DSL interface unit 11, and sends to the CPN 10 via the DSL port provided with the first DSL port partition. The backhaul interface unit 13 forwards a data package from the second NSP to the second virtual DSLAM unit based on VLAN; the DSLAM unit converts the data package from PPPoE into PPPoA, performs N:1 VLAN forwarding to the DSL interface unit, and sends to the CPE 10 via the DSL port provided with the second DSL port partition.

It can be seen from above, in the various embodiments, an AN may be shared among multiple NSPs and an independent management for the AN may be realized by the NSP in a wholesale scenario. Different protocols may be provided in accordance with different SP requirements. This provides extreme flexibility for wholesaling to different NSPs by the NAP.

FIG. 5 is a structural diagram of an ONU according to another various embodiment, including: at least two logic-independent virtual ONUs 22 adapted to provide different protocols and process a packet according to a predefined configuration; a user interface unit 21 connected with a CPE 20 via a DSL, an Ethernet Line or a Power Line Communication Line, for processing Physical Layer and Data Link Layer of the DSL, the Ethernet Line or the Power Line Communication Line, and for sending a packet from the CPE 20 to the corresponding virtual ONU 22; and an ODN interface unit 23 connected with OLT 29 via an ODN, for sending a packet processed by the virtual ONU 22 to the OLT 29 corresponding to the virtual ONU 22, and for sending a data package from the OLT 29 to the virtual ONU 22 corresponding to the OLT 29 for processing.

As shown in FIG. 5, the user interface unit 21 is provided with port partitions 210 corresponding to the plurality of virtual ONUs 22 for separating the virtual ONUs 22, and each of the virtual ONUs 22 supports a respective port partition 210. A port is partitioned into the port partitions based on SPs (OLTs are taken as an example in this embodiment), and includes any one or a combination of an actual Access Node Identifier (AN ID), a chassis number, a rack number, a frame number, a slot number, a sub-slot number, a port ID, a Virtual LAN Identifier (VLAN ID), an Ethernet Priority and a DSCP.

The ODN interface unit 23 is provided with Passive Optical Network (PON) port partitions 230 corresponding to the virtual ONUs 22 for separating the virtual ONUs 22 from each other, and each of the virtual ONUs 22 supports a respective PON port partition 230. A PON port is partitioned into the PON port partitions based on SPs, and defined as including any one or a combination of an actual Access Node Identifier (AN ID), a chassis number, a rack number, a frame number, a slot number, a sub-slot number, a PON interface number, an ONU ID, a Transmission-Container (T-CONT) ID, a port ID, a VLAN ID, and an Ethernet Priority.

The virtual ONU 22 has all functions of an independent ONU, and each virtual ONU 22 supports a corresponding port partition 210 and a corresponding PON port partition 230, which may be wholesaled to a respective NSP to be controlled and managed independently, so as to realize a wholesale over Layer two. The virtual ONUs 22 may be separated based on different port partitions 210 or different PON port partitions 230.

As shown in FIG. 5, the virtual ONU 22 at least includes a user access function sub-unit 221 for supporting user access processing of a DSL, an Ethernet Line or a Power Line Communication Line; and a PON adaptation function sub-unit 222 for supporting transmission adaptation processing by which a PON is accessed via a DSL, an Ethernet Line or a Power Line Communication Line.

For example, the user interface unit 21 supports, for example, a DSL, and the first NSP may configure the first virtual ONU which supports a user access based on PPPoA and APON adaptation function; and the second NSP may configure the second virtual ONU which supports a user access based on PPPoE and GPON adaptation function.

In an upstream direction, NSPs may be separated by means of DSL port partitions and the like. The user interface unit 21 sends a packet from the first DSL port partition to the first virtual ONU unit for processing; upon processing of PPPoA-based forwarding and APON adaptation, the packet is sent from the ODN interface unit 23 to an OLT (or then to an EN); and the OLT (or the EN) differentiates the packet via DSL port information such as a Circuit ID carried in a PPPoE TAG and sends it to the first NSP. The user interface unit 21 sends a data package from the second DSL port partition to the second virtual ONU unit for processing; upon processing of PPPoE-based forwarding and GPON adaptation, the packet is sent from the ODN interface unit 23 to an OLT (or then to an EN), and the OLT (or the EN) differentiates the packet via DSL port information such as a Circuit ID carried in a PPPoE TAG and sends it to the second NSP.

In a downstream direction, NSPs may be separated by means of PON port partitions and the like. The ODN interface unit 23 forwards a data package from the first NSP to the first virtual ONU unit based on the first PON part partition; upon the processing of APON adaptation and PPPoA-based forwarding for the data package by the virtual ONU unit, the data package is sent from the user interface unit 21 to the CPE 20 via the DSL port provided with the first DSL port partition. The ODN interface unit 23 forwards a data package from the second NSP to the second virtual ONU unit based on the second PON port partition; upon the processing of GPON adaptation and PPPoE-based forwarding for the data package by the virtual ONU unit, the data package is sent to the CPE 20 from the DSL port provided with the second DSL port partition.

It can be seen from above, in the various embodiments of the disclosure, an AN may be shared among multiple NSPs and an independent management for the AN may be realized by the NSP in a wholesale scenario. Different protocols may be provided in accordance with different SP requirements. This provides extreme flexibility for wholesaling to different NSPs by the NAP.

FIG. 6 is a structural diagram of an OLT according to various embodiments of the disclosure, including at least two logic-independent virtual OLT units 32 adapted to provide different protocols and process a packet based on a pre-defined configuration; an Optical Distribution Node (ODN) interface unit 31 connected with a ONU/ONT 30 via an ODN, for processing PON Physical Layer and Data Link Layer, and for sending a packet from the ONU/ONT 30 to the corresponding virtual OLT unit 32; and a backhaul interface unit 33 connected with an access edge node 39 (or carrier equipment) corresponding to the virtual OLT unit 32 via an Aggregation Network, for sending a packet processed by the virtual OLT unit 32 to the access edge node 39 (or the carrier equipment) corresponding to the virtual OLT unit 32, and sending a packet from the edge node 39 (or carrier equipment) to the virtual OLT unit 32 corresponding to the access edge node 39 (or the carrier equipment) for processing.

As shown in FIG. 6, the ODN interface unit 31 is provided with PON port partitions 310 corresponding to a plurality of virtual OLTs unit 32 for separating the virtual OLTs unit 32 from each other, and each of the virtual OLTs 32 supports a respective PON port partition 310. A PON port is partitioned into the PON port partitions based on SPs, and defined as including any one or a combination of an actual Access Node Identifier (AN ID), a chassis number, a rack number, a frame number, a slot number, a sub-slot number, a PON interface number, an ONU ID, a Transmission-Container (T-CONT) ID, a port ID, a VLAN ID, and an Ethernet Priority. The virtual OLT unit 32 has all functions of an independent OLT, and each virtual OLT unit 32 supports a corresponding port partition 310, which may be wholesaled to an NSP 39 to be controlled and managed independently, so as to realize a wholesale over Layer two. The virtual OLTs 32 may be separated based on different PON port partitions 310.

As shown in FIG. 6, the virtual OLT unit 32 at least includes a DHCP relay or proxy sub-unit 321 for supporting DHCP relay function where access loop identifier information is carried via DHCP; an Authenticator/Authentication, Authorization and Accounting (AAA) proxy sub-unit 322 for supporting authentication function; an IGMP proxy/snooping sub-unit 323 for snooping on a multicast destination IP address and/or a multicast source IP address of an IGMP packet so as to configure corresponding multicast media access control address filter; and a flow classification and Quality of Service (QoS) mapping sub-unit 324 for packet flow classification and QoS identifying.

For example, the first NSP may configure the first virtual OLT unit to support the snooping of IGMPv2 packets function; and the second NSP may configure the second virtual OLT unit to support the snooping of IGMPv3 packets function. The NSPs may be separated by means of PON port partitions and the like. The ODN interface unit 31 sends a packet from the first PON port partition to the first virtual OLT unit for processing; the virtual OLT unit snoops on IGMPv2 packets, thus appends the PON port into a multicast authority control list; and then the backhaul interface unit 33 sends the IGMPv2 packets to the EN, and the EN differentiates the packet via PON port information such as a Circuit ID carried in a PPPoE TAG and sends it to the first NSP. The ODN interface unit 31 sends a data package from the second PON port partition to the second virtual OLT unit for processing; the virtual OLT unit snoops on IGMPv3 packets, thus appends the PON port into a multicast authority control list and make control of the multicast source address; and then the backhaul interface unit 33 sends the IGMPv3 packets to the EN, and the EN differentiates the packet via PON port information such as a Circuit ID carried in a PPPoE TAG and sends it to the second NSP.

It can be seen from above, in various embodiments of the disclosure, an AN may be shared among multiple NSPs and an independent management for the AN may be realized by the NSP in a wholesale scenario. Different protocols may be provided in accordance with different SP requirements. This provides extreme flexibility for wholesaling to different NSPs by the NAP.

FIG. 7 is a structural diagram of a BS according to various embodiments of the disclosure, including at least two logic-independent virtual BS units 42 adapted to provide different protocols and process a packet according to a pre-defined configuration; an air interface unit 41 connected with a CPE 40 or a wireless terminal via an air interface, for processing a wireless Physical Layer and a Data Link Layer, and for sending a packet from the CPE 40 (or the wireless terminal) to the corresponding virtual BS unit 42, in this embodiment, a wireless interface unit specified in a Broadband wireless access standard of IEEE 802.16 is taken as an example, and the CPE 40 may include a Mobile Station; and a backhaul interface unit 43 connected with an access edge node 39 (or a carrier equipment) via an Aggregation Network, for sending a packet processed by the virtual BS unit 42 to the access edge node 39 (or the carrier equipment) corresponding to the virtual BS unit 42, and for sending a packet from the edge node 39 (or the carrier equipment) to the virtual BS unit 42 corresponding to the edge node 39 (or the carrier equipment) for processing.

As shown in FIG. 7, the air interface unit 41 is provided with air interface partitions 410 corresponding to the virtual BS units 42 for separating the virtual BS units 42 from each other, and each virtual BS unit 42 supports a respective air interface partition 410. An air interface identifier includes any one or a combination of an actual Access Node Identifier (AN ID), a chassis number, a rack number, a frame number, a slot number, a sub-slot number, a Remote Radio Unit (RRU), a sector number, a frequency number, a channel number, a Service Flow Identifier (SFID)/Connection Identifier (CID), a Virtual LAN Identifier (VLAN ID), an Ethernet Priority and a Differentiated Service code Point (DSCP).

The virtual BS unit 42 has all functions of an independent BS, and each virtual BS unit 42 supports a corresponding air interface partition 410 which may be wholesaled to an NSP 49 to be controlled and managed independently, so as to realize a wholesale over Layer two. The virtual BS units 42 may be separated based on different air interface partitions.

As shown in FIG. 7, the virtual BS unit 42 at least includes a DHCP relay or proxy sub-unit 421 for supporting DHCP relay function where access loop identifier information is carried via DHCP; an authentication relay sub-unit 422 for relaying the extensible authentication protocol packet; a handoff control sub-unit 423 for supporting the Layer Two handoff control function of a mobile service; a service flow management sub-unit 424 for creating, admitting, activating, modifying and deleting a service flow, which includes an admission control function and associated local resource information; a page proxy sub-unit 425 for supporting the management of activities of a wireless terminal in a sleeping mode or in an idle mode; and a wireless resource proxy sub-unit 426 for supporting the management of wireless resources.

For example, the first NSP may configure the first virtual BS unit to support the authentication relay function from Privacy Key Management (PKMv2) to 802.1x; and the second NSP may configure the second virtual BS unit to support the authentication relay function from PKMv2 to Protocol for carrying Authentication for Network Access (PANA). The NSPs may be separated by means of air interface partitions and the like. The air interface unit 41 sends a PKMv2 authentication packet from the first air interface partition to the first virtual BS unit for processing; upon the authentication relay from PKMv2 to 802.1x, the backhaul interface unit 43 sends the 802.1x authentication packets to the EN. The air interface unit 41 sends a PKMv2 authentication packet from the second air interface partition to the second virtual BS unit for processing; upon the authentication relay from PKMv2 to PANA, the backhaul interface unit 43 sends the PANA authentication packets to the EN.

It can be seen from above, in various embodiments of the disclosure, an AN may be shared among multiple NSPs and an independent management for the AN may be realized by the NSP in a wholesale scenario. Different protocols may be provided in accordance with different SP requirements. This provides extreme flexibility for wholesaling to different NSPs by the NAP.

Various embodiments of the disclosure further provide an Optical Access Network (OAN), including a Customer Premises Equipment (CPE), an edge node or a carrier equipment, an Optical Network Unit (ONU), and an Optical Line Terminal (OLT), in particular, the ONU includes:

at least two logic-independent virtual ONUs adapted to process a packet based on a respective pre-configured protocol;

a user interface unit connected with one or more Customer Premises Equipments (CPEs) via a Digital Subscriber Line, an Ethernet Line or a Power Line Communication Line, for processing Physical Layer and Data Link Layer of the Digital Subscriber Line, the Ethernet Line or the Power Line Communication Line, and for sending a packet from the one or more CPEs to the corresponding virtual ONU; and a first Optical Distribution Node interface unit connected with one or more Optical Line Terminals (OLTs) via an Optical Distribution Node (ODN), for sending a packet processed by the virtual ONU to the OLT corresponding to the virtual ONU, and for sending a data package from the OLT to the virtual ONU corresponding to the OLT for processing.

the OLT includes:

at least two logic-independent virtual OLT units adapted to process a packet based on a respective pre-configured protocol;

a second Optical Distribution Node interface unit connected with one or more Optical Network Units or Optical Network Terminals (ONU/ONTs) via an ODN, for processing Physical Layer and Data Link Layer of a Passive Optical Network, and for sending a packet from the one or more ONU/ONTs to the corresponding virtual OLT unit; and a backhaul interface unit connected with one or more edge nodes or carrier equipments via an Aggregation Network, for sending a packet processed by the virtual OLT unit to the access edge node or the carrier equipment corresponding to the virtual OLT unit, and for sending a packet from the access edge node or the carrier equipment to the virtual OLT unit corresponding to the access edge node or the carrier equipment for processing.

The foregoing descriptions are merely illustrative of the technical solutions in various embodiments of the disclosure, and not used as a limit. Although various embodiments of the disclosure have been illustrated in detail, it is appreciated by those ordinarily skilled in the art that various modifications and equivalent substitutions may be made to the technical solutions in the various embodiments of the disclosure without departing from the scope of the disclosure defined by the appended claims.

What is claimed is:

1. An Optical Network Unit (ONU) comprising:
   at least two logic-independent virtual ONUs each adapted to process a packet based on a respective pre-configured protocol, wherein a first virtual ONU of the at least two logic-independent virtual ONUs is configured to perform PPP over ATM (PPPoA)-based forwarding and ATM Passive Optical Network (PON) adaptation; wherein a second virtual ONU of the at least two logic-independent virtual ONUs is configured to perform PPP over Ethernet (PPPoE)-based forwarding and Ethernet PON adaptation;
   a user interface unit connected with one or more Customer Premises Equipments (CPEs) via a Digital Subscriber Line (DSL), an Ethernet Line or a Power Line Communication Line, for processing Physical Layer and Data Link Layer of the DSL, the Ethernet Line or the Power Line Communication Line, and for sending a packet from the one or more CPEs to the corresponding virtual ONU; and
   an Optical Distribution Node interface unit connected with one or more Optical Line Terminals (OLTs) via an Optical Distribution Node (ODN), for sending a packet processed by the virtual ONU to the OLT corresponding to the virtual ONU.

2. The ONU according to claim 1, wherein the Optical Distribution Node interface unit is also used for sending a data package from the OLT to the virtual ONU corresponding to the OLT for processing.

3. The ONU according to claim 1, wherein, the user interface unit is provided with port partitions corresponding to the plurality of virtual ONUs for separating the virtual ONUs from each other, and each of the virtual ONUs supports a respective port partition.

4. The ONU according claim 1, wherein, the ONU comprises:
   a user access function sub-unit for supporting user access processing of the DSL, an Ethernet Line or a Power Line Communication Line; and
   a Passive Optical Network (PON) adaptation function sub-unit for supporting transmission adaptation processing by which a PON is accessed via the DSL, the Ethernet Line or the Power Line Communication Line.

5. The ONU according claim 1, wherein, the ODN interface unit is provided with PON port partitions corresponding to the virtual ONUs for separating the virtual ONUs, and each of the virtual ONUs supports a respective PON port partition.

6. An Optical Line Terminal (OLT) comprising:
at least two logic-independent virtual OLT units adapted to process a packet based on a respective pre-configured protocol;
an Optical Distribution Node interface unit connected with one or more Optical Network Units (ONUs) or Optical Network Terminals (ONTs) via an Optical Distribution Node (ODN) for processing Physical Layer and Data Link Layer of a Passive Optical Network (PON), and for sending a packet from the one or more ONU/ONTs to the corresponding virtual OLT unit; and
a backhaul interface unit connected with one or more access edge nodes or carrier equipments via an Aggregation Network, for sending a packet processed by the virtual OLT unit to the access edge node or the carrier equipment corresponding to the virtual OLT unit;
wherein the virtual OLT unit comprises:
a Dynamic Host Configuration Protocol (DHCP) relay or proxy sub-unit for supporting DHCP relay function, wherein access loop identifier information is carried via DHCP;
an Authenticator/Authentication, Authorization and Accounting (AAA) proxy sub-unit for supporting authentication function;
an Internet Group Management Protocol (IGMP) proxy/snooping sub-unit for snooping on a multicast destination IP address and/or a multicast source IP address of an IGMP packet so as to configure respective multicast media access control address filter; and
a flow classification and Quality of Service (QoS) mapping sub-unit for packet flow classification and QoS type identifying.

7. The OLT according to claim 6, wherein,
the backhaul interface unit is also used for sending a packet from the access edge node or the carrier equipment to the virtual OLT unit corresponding to the access edge node or the carrier equipment for processing.

8. The OLT according to claim 6, wherein, the ODN interface unit is provided with Passive Optical Network (PON) port partitions corresponding to the plurality of virtual OLT units for separating the virtual OLT units from each other, and each of the virtual OLT units supports a respective PON port partition.

9. An Optical Access Network (OAN) comprising an Optical Network Unit (ONU), and one or more Optical Line Terminals (OLTs); wherein the ONU comprises:
at least two logic-independent virtual ONUs each adapted to process a packet based on a respective pre-configured protocol, wherein a first virtual ONU of the at least two virtual ONUs is configured to perform PPP over ATM (PPPoA)-based forwarding and ATM Passive Optical Network (PON) adaptation; wherein a second virtual ONU of the at least virtual ONUs is configured to perform PPP over Ethernet (PPPoE)-based forwarding and Ethernet PON adaptation;
a user interface unit connected with one or more Customer Premises Equipments (CPEs) via at least one of a Digital Subscriber Line (DSL), an Ethernet Line and a Power Line Communication Line, for processing Physical Layer and Data Link Layer of the at least one of DSL, the Ethernet Line and the Power Line Communication Line, and for sending a packet from the one or more CPEs to a corresponding virtual ONU; and
a first Optical Distribution Node interface unit connected with the one or more OLTs via an Optical Distribution Node (ODN) for sending a packet processed by the virtual ONU to an OLT corresponding to the virtual ONU.

10. The OAN according to claim 9, wherein,
the first Optical Distribution Node interface unit is also used for sending a data package from the OLT to the virtual ONU corresponding to the OLT for processing.

11. The OAN according to claim 9, wherein, the OLT comprises:
at least two logic-independent virtual OLT units adapted to process a packet based on a respective pre-configured protocol;
a second Optical Distribution Node interface unit connected with one or more Optical Network Units (ONUs) or Optical Network Terminals (ONTs) via an ODN, for processing Physical Layer and Data Link Layer of a Passive Optical Network, and for sending a packet from the one or more ONU/ONTs to the corresponding virtual OLT unit; and
a backhaul interface unit connected with one or more access edge nodes or carrier equipments via an Aggregation Network, for sending a packet processed by the virtual OLT unit to the access edge node or the carrier equipment corresponding to the virtual OLT unit.

12. The OAN according to claim 11, wherein, the backhaul interface unit is also used for sending a packet from the access edge node or the carrier equipment to the virtual OLT unit corresponding to the access edge node or the carrier equipment for processing.

13. An Optical Access Network (OAN) comprising an Optical Line Terminal (OLT) and a plurality of Optical Network Units (ONUs) connected to the OLT via Optical Distribution Node (ODN); wherein the OLT comprises:
at least two logic-independent virtual OLT units adapted to process a packet based on a respective pre-configured protocol, wherein different virtual OLT units are capable of corresponding to different Network Service Providers (NSPs); and
an Optical Distribution Node interface unit connected through the ODN to the one or more ONUs for processing Physical Layer and Data Link Layer of a Passive Optical Network (PON), and for sending a packet from a certain ONU to a corresponding virtual OLT unit;
wherein the corresponding virtual OLT unit comprises:
a Dynamic Host Configuration Protocol (DHCP) relay sub-unit for supporting DHCP relay function, wherein access loop identifier information is carried via DHCP;
an Internet Group Management Protocol (IGMP) proxy/snooping sub-unit for snooping on a multicast destination IP address and/or a multicast source IP address of an IGMP packet so as to configure respective multicast media access control address filter; and
a flow classification and Quality of Service (QoS) mapping sub-unit for packet flow classification and QoS type identifying.

14. The OAN according to claim 13, wherein the virtual OLT unit further comprises:
an Authenticator/Authentication, Authorization and Accounting (AAA) proxy sub-unit for supporting authentication function.

15. An access network device, comprising:
at least two logic-independent virtual access units adapted to process a packet based on a respective pre-configured protocol;

a customer interface unit connected with one or more customer devices for processing Physical Layer and Data Link Layer of an access network, and for sending a packet from the one or more customer devices to the corresponding virtual interface unit; and a backhaul interface unit connected with one or more access edge nodes or carrier equipments via an Aggregation Network, for sending a packet processed by the virtual interface unit to the access edge node or the carrier equipment corresponding to the virtual interface unit;

wherein the virtual access unit comprises:

an Internet Group Management Protocol (IGMP) proxy/snooping sub-unit for snooping on a multicast destination IP address and/or a multicast source IP address of an IGMP packet so as to configure respective multicast media access control address filter.

16. The access network device according to claim 15, wherein the virtual access unit further comprises:

a Dynamic Host Configuration Protocol (DHCP) relay or proxy sub-unit for supporting DHCP relay function, wherein access loop identifier information is carried via DHCP.

17. The access network device according to claim 15, wherein the access network device is a Digital Subscriber Line Access Multiplexer (DSLAM) or an Optical Line Terminal (OLT).

* * * * *